(12) United States Patent
Sadik et al.

(10) Patent No.: US 11,141,829 B2
(45) Date of Patent: Oct. 12, 2021

(54) METHOD OF MACHINING TI, TI-ALLOYS AND NI-BASED ALLOYS

(71) Applicant: SANDVIK INTELLECTUAL PROPERTY AB, Sandviken (SE)

(72) Inventors: Ibrahim Sadik, Kista (SE); Jose Luis Garcia, Stockholm (SE)

(73) Assignee: Sandvik Intellectual Property AB, Sandviken (SE)

( * ) Notice: Subject to any disclaimer, the term of this patent is extended or adjusted under 35 U.S.C. 154(b) by 91 days.

(21) Appl. No.: 16/338,068

(22) PCT Filed: Sep. 21, 2017

(86) PCT No.: PCT/EP2017/073893
§ 371 (c)(1),
(2) Date: Mar. 29, 2019

(87) PCT Pub. No.: WO2018/060046
PCT Pub. Date: Apr. 5, 2018

(65) Prior Publication Data
US 2019/0232449 A1 Aug. 1, 2019

(30) Foreign Application Priority Data
Sep. 30, 2016 (EP) .................................... 16191764

(51) Int. Cl.
*B23B 27/14* (2006.01)
*B23Q 11/10* (2006.01)
(Continued)

(52) U.S. Cl.
CPC ........ *B23Q 11/1053* (2013.01); *B23B 27/148* (2013.01); *C22C 29/067* (2013.01);
(Continued)

(58) Field of Classification Search
CPC ............ B23Q 11/1053; B23B 2222/88; B23B 2222/64; B23B 27/148; B23C 2222/64; B23C 2222/88
See application file for complete search history.

(56) References Cited

U.S. PATENT DOCUMENTS 5,761,974 A 6/1998 Wang et al.
6,447,912 B1 9/2002 Mikus et al.
(Continued)

FOREIGN PATENT DOCUMENTS

CN 1891842 A 1/2007
EP 0500119 A1 8/1992
(Continued)

OTHER PUBLICATIONS

Meng et al. Handbook of Graphic Interpretation of Tips of Advanced Mechanical Processing (vol. II), 878-880, Jun. 3, 2015.
(Continued)

*Primary Examiner* — Alan Snyder
(74) *Attorney, Agent, or Firm* — Corinne R. Gorski

(57) ABSTRACT

The use of cryogenic coolant in a machining operation in Ti, Ti-alloys or Ni-alloys together with a cutting tool of a cemented carbide substrate with a gradient surface zone with a thickness of between 50-400 μm is provided. The cemented carbide substrate has a binder phase gradient with the lowest binder phase content in the outermost part of the gradient surface zone and the cemented carbide having graphite. The arrangement leads to a significantly prolonged tool life.

14 Claims, 2 Drawing Sheets

(51) Int. Cl.
*C23C 30/00* (2006.01)
*C22C 29/06* (2006.01)

(52) U.S. Cl.
CPC ........ *C23C 30/005* (2013.01); *B23B 2222/64* (2013.01); *B23B 2222/88* (2013.01); *B23C 2222/64* (2013.01); *B23C 2222/88* (2013.01)

(56) References Cited

U.S. PATENT DOCUMENTS

| | | | |
|---|---|---|---|
| 2002/0174750 A1* | 11/2002 | Hessman | C23C 30/005 82/1.11 |
| 2003/0110781 A1 | 6/2003 | Zurecki et al. | |
| 2006/0053987 A1* | 3/2006 | Ghosh | B23C 5/28 82/1.11 |
| 2011/0048183 A1 | 3/2011 | Shin | |
| 2013/0118308 A1 | 5/2013 | Fang et al. | |

FOREIGN PATENT DOCUMENTS

| | | |
|---|---|---|
| JP | H0222453 A | 1/1990 |
| WO | 2015117079 A1 | 8/2015 |

OTHER PUBLICATIONS

Zhao et al. Design and Application of Modem Tool. pp. 165-166 and 553-554. Sep. 30, 2014.

\* cited by examiner

METHOD OF MACHINING TI, TI-ALLOYS AND NI-BASED ALLOYS

RELATED APPLICATION DATA

This application is a § 371 National Stage Application of PCT International Application No. PCT/EP2017/073893 filed Sep. 21, 2017 claiming priority to EP Application No. 16191764.0 filed Sep. 30, 2016.

TECHNICAL FIELD

The present invention relates to the use of a cemented carbide cutting tool comprising WC and a binder phase with a gradient surface zone depleted of binder phase and where the cutting tool comprises graphite together with a cryogenic coolant when machining Ti, Ti-alloys and Ni-based alloys.

BACKGROUND

Cutting tools made of cemented carbide are well known in the art for machining Ti-alloys and Ni-based alloys like Inconel. These materials are known to be difficult to machine. One problem that can occur when machining these types of work piece materials is chemical wear.

Chemical wear is common for machining TI and Ti-alloys. Therefore, the solubility and reactivity with the work piece material is found to be very important when selecting an insert for machining Ti-alloys. The extremely low thermal conductivity of Ti causes heat transfer to the insert and enhanced chemical reactivity.

It is also well known in the art of machining that it is beneficial to use some type of cooling in order to keep the temperature down.

In many applications a coolant is used to achieve this. However, the conventional coolants are not always environmentally friendly and needs to be processed. Recycling of the coolant is difficult since it will contain chips from the work piece material. Larger chips can of course be removed but the smaller ones in the range of a few micrometers will remain. These small fragments can cause damage to the work piece material if the coolant is reused.

Also, the use of conventional coolants such as emulsions or MQL (minimum quantity lubrication) can, in some aerospace applications, limit the possibility to recycle the chips. For example, in some aerospace applications, recycled chips cannot be used when producing new alloys due to contamination with coolant emulsions or lubricants.

For some applications, the cooling effect that is achieved by the conventional coolants (emulsions) is not enough. Cryogenic machining is one alternative to achieve a more efficient cooling effect. Cryogenic cooling is also a good alternative to traditional coolants for environmental reasons since they are non-toxic.

SUMMARY

One object of the present invention is to improve the tool life when machining Ti, Ti-alloys and Ni-based alloys.

DETAILED DESCRIPTION OF THE INVENTION

Figure 1A:
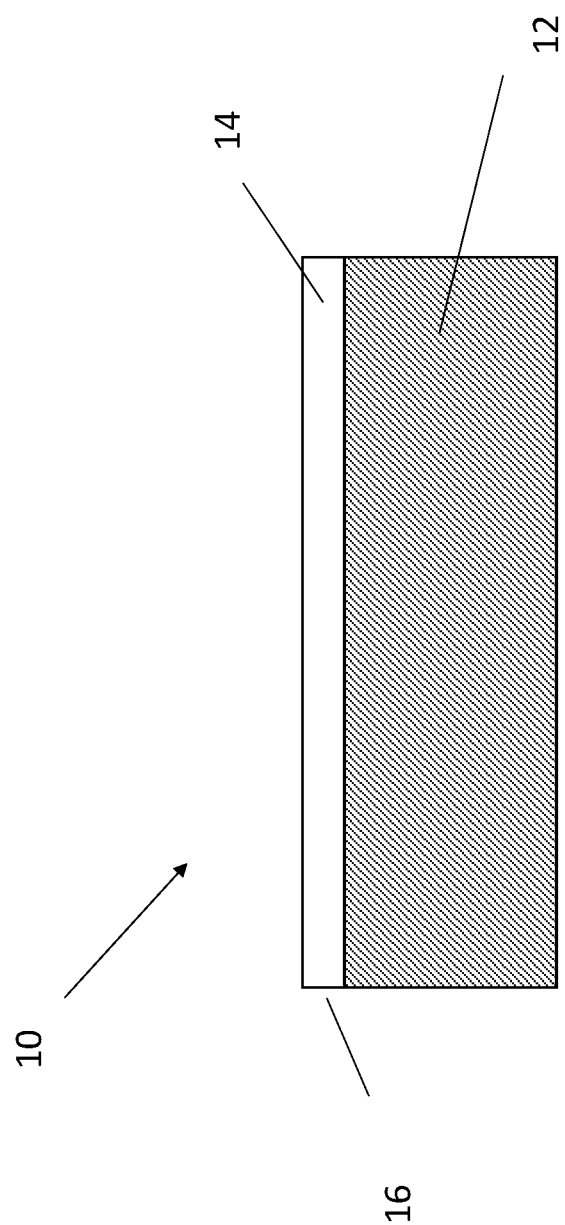
FIGS. 1A and 1B are cross-sections of a cutting tool according to the present disclosure.

Referring to FIG. 1A, the present invention relates to the use of a cutting tool 10 comprising a cemented carbide substrate 12 with a gradient surface zone 14 with a thickness of between 50-400 μm. The surface zone has a binder phase gradient with the lowest binder phase content in the outermost part of the gradient surface zone and wherein the cemented carbide comprises graphite. The cutting tool is used together with cryogenic coolant when machining Ti, Ti-alloys or Ni-based alloys.

It has been discovered that the combination of an excess amount of carbon in the substrate and a cryogenic coolant can considerably prolong the tool life when machining Ti, Ti-alloys and Ni-based alloys. Specifically, for Ti and Ti-alloys, the chemical wear leads—among others- to the formation of a Co—Ti melt, fast diffusion of carbon in the cobalt and a chemical reaction between Ti and C. Ti reacts with C from the WC grains leading to degradation of WC and eta-phase ($W_6Co_6C$, $W_3Co_3C$) or $W_2C$ formation. This causes embrittlement of the cemented carbide, rip out of grains and rapid wear of the tool which reduces the tool life considerably.

The definition of cryogenic has somewhat varied over the years. The scientific definition is that the temperature should be below −153° C. However, in recent years the definition has somewhat broaden and in more recent publications e.g. $CO_2$ is also included which has a temperature of −80° C.

By cryogenic cooling is herein meant that the coolant ha a temperature below −50° C. Suitably the coolant is liquid nitrogen and/or $CO_2$.

In one embodiment of the present invention the coolant is liquid nitrogen.

In another embodiment of the present invention the coolant is liquid $CO_2$. The $CO_2$ can either be in the form of a liquid (supercritical), a gas or a mix of liquid/gas.

In one embodiment of the present invention, the cryogenic coolant is combined with MQL (minimum quantity lubrication).

In another embodiment of the present invention the cryogenic coolant is combined with compressed air. This is beneficial sometimes to help remove the chips from the cutting area.

In another embodiment of the present invention the cryogenic coolant is combined with both compressed air and MQL (minimum quantity lubrication).

The flow of the coolant depends on the exact application and setup but is suitably between 0.05 to 1 kg/min. The pressure of the coolant will also vary depending on the exact application and setup but is suitably between 3 to 100 Bar.

The coolant can be applied in different ways depending on the type of machining operation and tool type etc.

In one embodiment of the present invention, the coolant is provided by external cooling. By that is meant that the coolant is provided by one or more separate nozzles directed towards the area where the machining takes place, i.e. where the tool and the workpiece material meet.

In one embodiment of the present invention, the coolant is provided by internal cooling through the tool holder. By that is meant that the coolant is provided by channels in the tool holder that will apply the coolant directly onto the cutting tool. In one embodiment of the present invention, the coolant is provided by internal cooling through the tool holder and the cutting tool in a closed loop. By that is meant that the coolant is provided through channels which will lead the coolant through the tool holder and through the cutting tool and then back again through the tool holder in a closed loop. The coolant can thus be reused.

In one embodiment of the present invention, the coolant is provided by internal cooling through the tool holder and the cutting tool and where the coolant is leaving the cutting tool, i.e. there is no closed loop. This embodiment is common for e.g. drills.

In one embodiment of the present invention, the coolant can be provided by a combination of at least two types of cooling methods as disclosed above, i.e. selected from external cooling, internal cooling through the tool holder and internal cooling through the tool holder and through the cutting tool with or without closed loop.

In one embodiment of the present invention, the method of machining is suitably a turning operation. Suitably the machining parameters are $V_c$ between 30 and 200 m/min, preferably between 30 and 120 m/min, more preferably between 50 to 90 m/min, $a_p$ between 0.1 and 5 mm, preferably between 0.3 and 2 mm. The feed rate, $f_z$, is suitably between 0.05 and 0.4 mm/rev, preferably between 0.05 and 0.3 mm/rev.

The cutting tool comprising a substrate of cemented carbide according to the present invention is suitable for machining non-ferrous alloys, most suitable for Ti or Ti-alloys and/or Ni-based alloys and most suitable for Ti or Ti-alloys. Examples of Ti and Ti alloys are suitably α, β and γ alloys, e.g. α-Ti and α-alloys such as $Ti_5Al_{2.5}Sn$, near α-alloys such as $Ti_6Al_2Sn_4Zr_2Mo$, .α+β alloys such as $Ti_6Al_2Sn_4Zr_6Mo$ and $Ti_6Al_4V$. Examples of Ni-based alloys are Inconel 718, Waspaloy and Haynes 282 alloy.

The cutting tool comprises a cemented carbide substrate comprising WC and a binder phase with a gradient surface zone with a thickness of between 50-400 μm. The gradient surface zone has a binder phase gradient with the lowest binder phase content in the outermost part of the gradient surface zone. Further, the cemented carbide substrate comprises graphite.

According to the present invention, the gradient surface zone is depleted of binder phase, i.e. the binder phase content in the gradient surface zone is lower than the binder phase content in the bulk of the cemented carbide. One way to measure the binder phase content is by Microprobe Jeol JXA8530F with an EDS/WDS detector.

The thickness of the gradient surface zone is suitably between 50 to 400 μm, preferably between 120 to 250 μm. The surface gradient zone is defined as the area between the surface of the tool and the point where the binder phase content is no longer changing, i.e. where the bulk starts.

In one embodiment of the present invention, the binder phase content in the gradient surface zone is 0.2 to 0.9 of the binder phase content in the bulk. The increase of the binder phase content in the gradient surface zone starting from the surface towards the bulk is gradual until the end of the gradient surface zone.

The graphite content in the cutting tool comprising a substrate of cemented carbide is such that graphite precipitates can clearly be seen when using a Light Optic Microscope (LOM). This type of graphite precipitates can also be called free graphite. The graphite can be seen in the gradient surface zone and in some cases also throughout the whole cemented carbide body, i.e. both the gradient surface zone and bulk.

One way to describe the amount of graphite is by C-porosity measured according to DIN ISO 4505. By this is herein meant that, in an image of a magnification of 100 times (fach), where the image includes the nose, preferably the cutting edge, of the tool and an area of the tool of at least 600 times 600 μm, the C-porosity in the area with the largest amount of graphite is suitably between C02 and C08, preferably between C04 to C08, more preferably between C06 and C08.

In one embodiment of the present invention, the graphite is present in the gradient surface zone.

In one embodiment of the present invention, the graphite is only present in the gradient surface zone.

The WC in the cemented carbide substrate according to the present invention suitably has an average grain size of between 0.4 to 10 μm, preferably between 1.2 to 4.0 μm.

In addition to WC and a binder phase, the cemented carbide can also comprise other constituents common in the art of making cemented carbides e.g. Nb, Ta, Ti and Cr. The amount of these elements may vary between 20 ppm by weight and 5 wt % of the total cemented carbide.

In one embodiment of the present invention, the amount of additional constituents, i.e. in addition to WC, is between 20 ppm by weight and 1 wt %, preferably between 20 and 250 ppm by weight of the total cemented carbide.

In another embodiment of the present invention, WC is the only hard constituent present in the cemented carbide.

The cemented carbide can also comprise small amounts of other elements common in the art, such as rare earths, oxides, aluminides and borides.

The binder phase content in cemented carbide substrate is suitably between 2 to 25 wt %, preferably between 4 to 10 wt % and more preferably 5 to 7 wt %.

The binder phase can comprise one or more of Co, Ni and Fe.

In one embodiment of the present invention, the binder phase mainly comprises Co. By that is herein meant that, as raw material for the binder phase, only Co is added. However, during manufacturing other elements might dissolve partly in the Co.

In one embodiment of the present invention, the cemented carbide consists of WC and Co and unavoidable impurities. The total carbon content in the product will vary with the WC-content since contributes to the total carbon content.

For example, for a cemented carbide comprising 94 wt % WC and 6 wt % Co the total carbon content in the material is suitably between 5.80 to 5.95 wt %, preferably between 5.89 to 5.93 wt %. The carbon content can for example be measured by a LECO instrument as described in the examples.

In one embodiment of the present invention, the cemented carbide consists of WC and 5-7 wt % Co and unavoidable impurities.

Figure 1B:
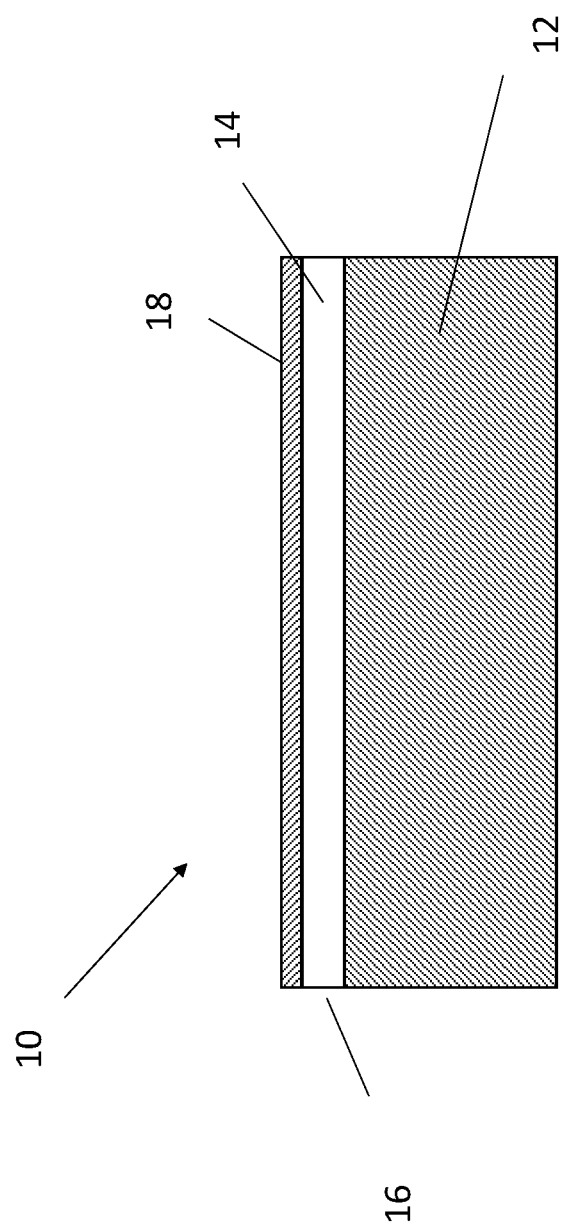

It is common in the art to provide cemented carbide tools with a coating in order to increase the tool life. The cemented carbide according to the present invention can either be uncoated or be provided with a coating 18 as shown in FIG. 1B, for example, a CVD, CVD Plasma or PVD coating known in the art.

In one embodiment of the present invention, a cutting tool according to the present invention is suitably uncoated.

In one embodiment of the present invention, the cemented carbide body is provided with a coating useful for wear detection, e.g. TiN with a thickness of 0.2-3 μm.

In another embodiment of the present invention, the cemented carbide body is provided with a coating comprising carbon, e.g. a DLC coating with a thickness of 0.2-3 μm . . . deposited by e.g. CVD, in order to provide an extra carbon source.

In another embodiment of the present invention, the cemented carbide body is provided with a coating comprising diamond with a thickness of between 0.5 to 15 μm.

In another embodiment of the present invention, the cemented carbide body is provided with a coating comprising a ZrC monolayer with a thickness of 0.2-3 μm by CVD deposition.

By cutting tool is herein meant an insert, drill or an end mill.

In one embodiment of the present invention, the cutting tool is a turning insert.

The present invention also relates to a method of machining Ti, Ti alloys or Ni-based alloys by the use of a cutting tool, as has been described above, comprising a cemented carbide substrate with a gradient surface zone with a thickness of between 50-400 μm. The surface zone has a binder phase gradient with the lowest binder phase content in the outermost part of the gradient surface zone and wherein the cemented carbide comprises free graphite. The cutting tool is used together with a cryogenic coolant.

Example 1 (Invention)

The insert according to the present invention is made by first making a conventional cemented carbide, the first cemented carbide body, which neither contains eta phase or graphite. The first cemented carbide body is also free from any binder phase gradients. Then the first cemented carbide body is subjected to a second sintering step which is performed in a carburizing environment.

The first cemented carbide body is manufactured by blending a mixture made of WC, 6 wt % Co with additional carbon was mixed and blended for 18 h, pressed and sintered at 1410° C. for 1 h under vacuum conditions. After sintering the cemented carbide consists of WC embedded in Co metal binder phase. The total carbon after sintering was 5.70 wt % C. The carbon content is measured by combustion of the sample and then analyzing the products by solid state IR detection. The analysis takes place in a LECO WC-600 instrument. The accuracy of the values is ±0.01 wt %. The first sintered body did not contain any eta phase or graphite.

After the first sintering step the cemented carbide body was subjected to a second sintering step by heat treating the cemented carbide body for 1 h at a temperature of 1350° C. in a sintering atmosphere containing a mixture of $CH_4/H_2$ to produce a Co-depleted gradient surface zone in the cemented carbide. After the heat treatment the cemented carbide comprised WC, Co and graphite precipitates with a C-porosity of C06 according to ISO DIN 4505. Additionally due to the sintering treatment in an atmosphere with a carbon activity higher compared to the cemented carbide, a Co-depleted gradient surface zone of 130 μm is formed in the cemented carbide.

The gradient is measured on a cross-section of the insert at three different positions, the nose, the rake and face side using a Microprobe Jeol JXA8530F with an EDS/WDS detector with a beam energy of 15 kW 50 nA, a probe diameter of 1 μm and a dwelltime of 1000 ms.

The total carbon content measured by LECO after the heat treatment was 5.89 wt % C. This cemented carbide body is called Sample 1.

Example 2 (Prior Art)

A mixture made of WC, 6 wt % Co with additional extra carbon was mixed and blended for 18 h, pressed and sintered at 1410° C. for 1 h under vacuum conditions. After sintering the cemented carbide comprised WC embedded in a Co metal binder phase. The total carbon measured by LECO after sintering was 5.76 wt % C. The carbon content has been measured as described in example 1. No gradient of graphite was present and no C-porosity could be detected. This cemented carbide body is called Sample 2.

Example 3 (Working Example)

The inserts CNMG 120408-SM described in example 1 and 2 were tested in a turning operation in a $Ti_6Al_4V$ alloy using the following conditions:
$a_p$=2 mm
$F_z$=0.1-0.2 mm/rev, Variable
Vc=70 m/min
Coolant: Liquid nitrogen, 7 bar, 0.85 kg/min, internal through the holder
The tool life criterion was flank wear (VB=0.3 mm), notch ($VB_n$=0.4 mm) or edge destruction.
The results can be seen in Table 1 where each result is an average of two tests, i.e. of two inserts.

TABLE 1

| Cutting tool | Feed rate (mm/rev) | Tool life (minutes) |
| --- | --- | --- |
| Sample 1 (Invention) | 0.1 | 61 |
| Sample 2 (Comparative) | 0.1 | 20 |
| Sample 1 (Invention) | 0.15 | 28 |
| Sample 2 (Comparative) | 0.15 | 6 |
| Sample 1 (Invention) | 0.2 | 14 |
| Sample 2 (Comparative) | 0.2 | 3 |

As can be seen in Table 1, the cutting tool according to the present invention has a considerably longer tool life than the reference.

Example 4 (Working Example)

The inserts described in example 1 and 2 were tested in a turning operation in a $Ti_6Al_4V$ alloy using the following conditions:
$a_p$=2 mm
$F_z$=0.1-0.2 mm/rev, Variable
Vc=115 m/min
Cooling: Liquid nitrogen, 7 bar, 0.85 kg/min, internal through the holder
The tool life criterion was extended flank wear above 0.4 mm.
The tool life criterion was flank wear (VB=0.3 mm), notch ($VB_n$=0.4 mm) or edge destruction.
The results can be seen in Table 2 where each result is an average of two tests, i.e. of two inserts.

TABLE 2

| Cutting tool | Feed rate (mm/rev) | Tool life (minutes) |
| --- | --- | --- |
| Sample 1 (Invention) | 0.1 | 5 |
| Sample 2 (Comparative) | 0.1 | 1 |
| Sample 1 (Invention) | 0.15 | 2.5 |
| Sample 2 (Comparative) | 0.15 | 0.5 |
| Sample 1 (Invention) | 0.2 | 1.5 |
| Sample 2 (Comparative) | 0.2 | 0.3 |

As can be seen in Table 2, the cutting tool according to the present invention has a considerably longer tool life than the reference.

The invention claimed is:
1. A method of using a cutting tool to machine Ti, Ti-alloys or Ni—based alloys comprising the steps of:
   providing a cutting tool comprising a cemented carbide substrate with a gradient surface zone having a thickness of between 50-400 μm and a binder phase gradient with a lowest binder phase content being in an outermost part of the gradient surface zone and wherein the cemented carbide includes graphite, wherein an amount of graphite in the gradient surface zone of the cemented carbide substrate is such that a C-porosity is CO2-CO8; and using the cutting tool in a machining operation of Ti, Ti-alloys or Ni-based alloys together with a cryogenic coolant.

2. The method of using a cutting tool according to claim 1, wherein the cryogenic coolant is liquid nitrogen.

3. The method of using a cutting tool according to claim 1, wherein the cryogenic coolant is liquid $CO_2$.

4. The method of using a cutting tool according to claim 1, wherein the machining operation is a turning operation operated at a $V_c$ of between 30 to 200 m/min, at an $a_p$ between 0.1 to 5 mm and at a feed rate of between 0.05 to 0.4 mm/rev.

5. The method of using a cutting tool according to claim 1, wherein the cryogenic coolant is provided through external cooling.

6. The method of using a cutting tool according to claim 1, wherein the cryogenic coolant is provided through internal cooling through a tool holder.

7. The method of using a cutting tool according to claim 1, wherein the cryogenic coolant is provided through internal cooling through a tool holder and the cutting tool in a closed loop.

8. The method of using a cutting tool according to claim 1, wherein the thickness of the gradient surface zone of the cemented carbide substrate is between 120 to 250 μm.

9. The method of using a cutting tool according to claim 1, wherein an amount of graphite in the cemented carbide substrate is such that a C-porosity is CO4-CO8.

10. The method of using a cutting tool according to claim 1, wherein the graphite in the cemented carbide substrate is present in the gradient surface zone.

11. The method of using a cutting tool according to claim 1, wherein, for the cemented carbide substrate, the binder phase is cobalt and that the cobalt content is between 4 to 10 wt %.

12. The method of using a cutting tool according to claim 1, wherein the cutting tool is uncoated.

13. The method of using a cutting tool according to claim 1, wherein the cutting tool is provided with a coating.

14. A method of machining Ti, Ti alloys or Ni-based alloys comprising:

providing a cutting tool comprising a cemented carbide substrate with a gradient surface zone having a thickness of between 50-400 μm and a binder phase gradient with a lowest binder phase content being in an outermost part of the gradient surface zone and wherein the cemented carbide includes graphite, wherein an amount of graphite in the gradient surface zone of the cemented carbide substrate is such that a C-porosity is CO2-CO8; and using the cutting tool together with a cryogenic coolant.

* * * * *